Apr. 10, 1923. 1,451,576

H. A. HOUSTON

FLEXIBLE PINION

Filed July 11, 1922

WITNESSES:

INVENTOR
Harold A. Houston.
BY
ATTORNEY

Patented Apr. 10, 1923.

1,451,576

UNITED STATES PATENT OFFICE.

HAROLD A. HOUSTON, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE PINION.

Application filed July 11, 1922. Serial No. 574,311.

*To all whom it may concern:*

Be it known that I, HAROLD A. HOUSTON, a citizen of the United States, and a resident of Wilkinsburg, in the county of Allegheny and State of Pennsylvania, have invented a new and useful Improvement in Flexible Pinions, of which the following is a specification.

My invention relates to flexible driving mechanisms, more especially to flexible elements employed in connection with electrically propelled locomotives, heavy-duty machines and the like.

In my co-pending application, Serial No. 540,126, filed March 1, 1922, and assigned to the Westinghouse Electric & Manufacturing Company, I have described a flexible element which functions as a yielding connection between the jack-shaft gear and the motor-pinion gears of the locomotive drive to break up the steel-bound ring formed by solid pinions in mesh with the rim of solid or flexible gears.

My present invention is directed to improvements on this type of flexible element and it is among the objects thereof to provide a flexible gear mounting for electric locomotive and other propulsion devices which shall be of simple, compact structure and which shall be mechanically strong and efficient in its operation.

Figure 1:
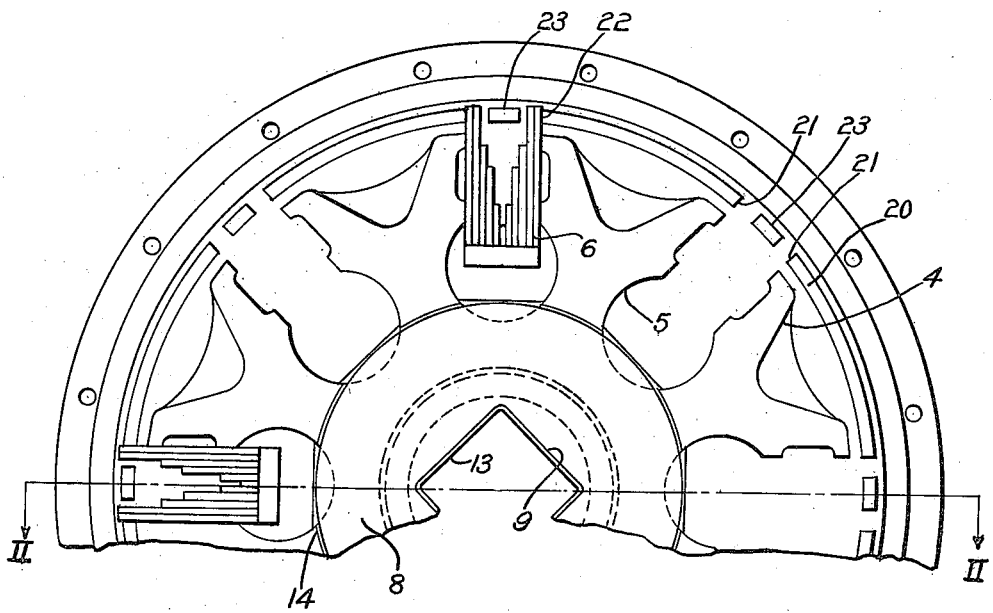
Figure 2:
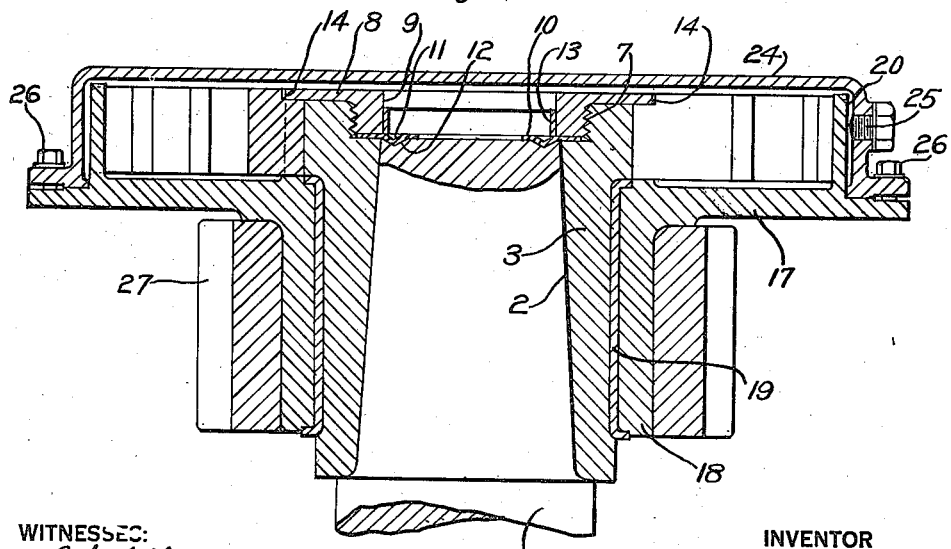

In the accompanying drawing constituting a part hereof and in which like reference characters designate like parts, Figure 1 is a side elevational view of a fragmentary portion of a flexible element made in accordance with the principles of this invention; and Fig. 2 is a cross-sectional view thereof taken along the lines II—II of Fig. 1.

Referring to the Fig. 2, my flexible gear mounting consists of a shaft 1 having a tapered end 2 adapted to receive a correspondingly shaped hub or spider 3 having a plurality of spokes or legs 4 projecting thereon and having a plurality of recesses 5 adapted to receive correspondingly shaped spring nests 6. The hub 3 is provided with a countersunk threaded portion 7 adapted to receive a flanged ring nut 8 having a rectangular opening 9. The ring nut 8 is secured to the hub 3 and shaft 1 by a lock washer 10 having a depression 11 fitting into a correspondingly shaped groove 12 in the end of the shaft 1 and being further provided with an up-struck portion 13 fitting into the recess 9 of the ring nut 8. The ring nut 8 is further adapted to engage the spring nests 6 which are provided with an off-set 14, on which the flange seats. A casing 17 having an extended portion 18 which is provided with a bearing 19 is rotatably mounted on the hub 3. The casing 17 is provided with a projecting ring 20 provided with a plurality of notches 21 adapted to receive the projecting leaves 22 of the spring nests 6. The notches 21 have a portion of the ring therebetween which acts as a stop lug 23 to limit the flexing of the leaves 22. The casing 17 is adapted to receive a cover 24 which is provided with a capped opening 25 and is secured thereto by a plurality of cap screws 26. A gear 27 is securely mounted upon the extended portion 18 of the casing 17.

The operation of my device is briefly as follows: the drive shaft 1, which is the armature shaft of a motor, rotates the hub member 3 which is secured thereto and applies tension to the leaf springs 22 which engage the rim 20 of the casing 17, causing it to rotate. The gear 27, being secured to the casing 17, is driven through the leaf springs 22 which are designed to carry a definite load. When this load is exceeded, the spring leaves are advanced to the rim until they engage the lugs 23, which locks them in position and prevents further tension.

It will be evident from the above description of this invention that a flexible driving mechanism made in accordance therewith provides a simple, compact structure which is especially adapted for use on electric locomotive drives where the space between the gear or pinion and the connecting rods is very limited and where a mechanically durable structure is required.

Although I have described a specific embodiment of my invention, it will be obvious to those skilled in the art that various modifications may be made in the details of construction without departing from the principles herein set forth. For instance, the hub member may be secured to the shaft in any suitable manner other than described or the notching of the rim may be altered by providing one large notch in place of the two smaller ones, and the locking of the spring members may be effected by providing a pair of bumpers or clips which are secured to the leaf springs.

I claim as my invention:

1. A gear mounting comprising a shaft, a flanged hub secured thereto, a casing for housing said hub and rotatably mounted thereon, a plurality of flexible members disposed between said hub and said casing and a gear secured to an extended portion of said casing.

2. A flexible gear mounting comprising a shaft, a flanged hub secured thereto, a casing for housing said hub and having an extended portion provided with a bearing which is rotatably mounted on said hub, a plurality of flexible members disposed between said hub and said casing and a gear secured to said extended portion of said casing.

3. A flexible gear mounting comprising a shaft, a flanged hub secured thereto, a casing for housing said hub and having an extended portion provided with a bearing which is rotatably mounted on said hub, a plurality of spring nests, a plurality of flexible members disposed between said hub and said casing and a gear secured to said extended portion of said casing.

4. A flexible gear mounting comprising a shaft, a flanged hub secured thereto, a casing for housing said hub and having an extended portion provided with a bearing which is rotatably mounted on said hub, a plurality of spring nests, a plurality of flexible members disposed between said hub and said casing and a gear secured to said extended portion of said casing and a flanged ring nut secured to said hub for holding said spring nests in their respective positions.

5. A flexible gear mounting comprising a shaft, a flanged hub secured thereto, a casing for housing said hub and having an extended portion provided with a bearing which is rotatably mounted on said hub, a plurality of spring nests disposed between said hub and said casing and a gear secured to said extended portion of said casing, a lock washer inserted in said hub and a flanged ring nut secured thereto and seating on said washer.

6. A flexible gear mounting comprising a shaft having an annular groove in the end thereof, a flanged hub provided with a plurality of recesses adapted to receive correspondingly shaped spring nests secured to said shaft, a casing for housing said hub and having an extended portion provided with a bearing which is rotatably mounted on said hub and being further provided with an annular projecting rim having notches adapted to receive the projecting leaves of said spring nests, a gear secured to said extended portion of said casing, a lock washer having a depression therein adapted to seat in the groove of said shaft and having an upstruck flange thereon and a flanged ring nut secured to said hub and having a rectangular opening adapted to receive said upstruck flange and having its flanged portion in engagement with said spring nest.

7. A flexible gear mounting comprising a shaft, a flanged hub secured thereto, a casing for housing said hub and rotatably mounted thereon, a plurality of spring nests disposed between said hub and said casing, and a flanged ring nut secured in said hub to hold said spring nests in their respective positions.

8. A flexible gear mounting comprising a shaft, a flanged hub secured thereto, a casing for housing said hub and rotatably mounted thereon, a plurality of spring nests disposed between said hub and said casing, a ring nut secured in said hub to hold said spring nests in their respective positions and means for locking said ring nut to said hub and shaft.

9. A flexible gear mounting comprising a shaft, a flanged hub secured thereto, a casing for housing said hub and rotatably mounted thereon, a plurality of spring nests disposed between said hub and said casing, a ring nut secured in said hub to hold said spring nests in their respective positions and means for locking said ring nut to said hub and shaft, said means comprising a spring washer having a depressed portion in engagement with said shaft and an upstruck portion in engagement with said nut.

In testimony whereof, I have hereunto subscribed my name this 5th day of July 1922.

HAROLD A. HOUSTON.